(12) United States Patent
Reverso

(10) Patent No.: US 6,337,056 B1
(45) Date of Patent: Jan. 8, 2002

(54) PROCESS FOR REFINING NOBLE METALS FROM AURIFEROUS MINES

(76) Inventor: Riccardo Reverso, Via Mazzoni, 4, 15100 Alessandria (IT)

( * ) Notice: Subject to any disclaimer, the term of this patent is extended or adjusted under 35 U.S.C. 154(b) by 0 days.

(21) Appl. No.: 09/411,402

(22) Filed: Oct. 4, 1999

(51) Int. Cl.[7] .............................. C01G 5/00; C01G 7/00; C01G 55/00
(52) U.S. Cl. .............................. 423/29; 423/22; 423/24; 423/32; 423/34; 423/42; 423/27
(58) Field of Search .............................. 423/22, 24, 29, 423/32, 34, 42, 27

(56) References Cited

U.S. PATENT DOCUMENTS

| | | | | |
|---|---|---|---|---|
| 2,371,119 A | * | 3/1945 | Nachod | |
| 2,875,040 A | * | 2/1959 | Barabas | |
| 3,317,313 A | * | 5/1967 | Buggs et al. | |
| 4,297,134 A | * | 10/1981 | Yamada | |
| 4,900,520 A | * | 2/1990 | Behnam et al. | |
| 5,320,720 A | * | 6/1994 | Hayden et al. | |
| 5,792,235 A | * | 8/1998 | Kohr | ..................................... |

* cited by examiner

Primary Examiner—Steven P. Griffin
Assistant Examiner—Christina Ildebrando
(74) Attorney, Agent, or Firm—Guido Modiano; Albert Josif; Daniel O'Byrne

(57) ABSTRACT

A process for refining noble metals from auriferous mines, wherein the auriferous material is first milled and treated with a cyanide solution, and comprising: a step for the pretreatment of the auriferous material, wherein the complexes of cyanide with noble metals are fixed on anionic resins and then incinerated; a predefining step, which comprises an etching of the materials incinerated during the pretreatment with a hydrochloric-nitric solution; and specific steps for refining the gold, palladium, platinum and silver.

17 Claims, 5 Drawing Sheets

PROCESS FOR REFINING NOBLE METALS FROM AURIFEROUS MINES

BACKGROUND OF THE INVENTION

The present invention relates to a process for refining noble metals from auriferous mines.

Particularly, the present invention relates to a process for extracting particles of noble metals embedded in auriferous rocks by chemical methods.

The technology for extracting noble metals currently entails the execution of a preliminary step of coarse grinding of the material that arrives from the auriferous veins and a subsequent crushing in a ball mill to obtain very fine powder.

The milled rock is then circulated in countercurrent with respect to a solution of cyanides in tanks equipped with an agitator and then in concentrating tanks to dissolve the noble metals and separate out the residual rock.

The solution is then subjected to clarification and mixed with zinc powder in order to precipitate the gold in the form of solid particles which are filtered out of the liquid mix by means of a press filter together with the excess zinc powder.

The reaction scheme is as follows:

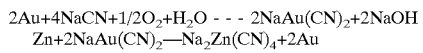

$$2Au+4NaCN+1/2O_2+H_2O \text{ - - - } 2NaAu(CN)_2+2NaOH$$
$$Zn+2NaAu(CN)_2 \rightarrow Na_2Zn(CN)_4+2Au$$

The filter cake is then smelted in a furnace and the molten material is cast into conical ingots, on the bottom which the solid gold is separated from the slag.

The resulting crude gold ingot, which generally contains impurities such as silver, copper and other heavy metals, in addition to traces of metals of the platinum and palladium group, is first remelted in an oxidizing environment in order to slag off most of the heavy metals and is then subjected to chlorination by bubbling chlorine gas through the molten impure gold. The metals volatilize and slag off as chlorides, while the silver converts to salt silver chloride, and remains in the molten state and is separated by decantation.

Finally, the crude material containing gold, platinum and palladium is refined electrolytically with anodes consisting of crude gold ingots.

In order to separate the silver and prevent it from depositing on the anode, an AC-type current is superimposed on a DC current; the copper, palladium and platinum enter the solution as chlorides, while most of the other metals remain in the silver chloride sludge that deposits below the anode and must be treated again.

However, conventional technologies for the extraction of heavy metals are not free from drawbacks in use which lead to a loss of noble material.

A first drawback of the prior art is related to the equilibrium of the above-described zinc/auric salt reaction, which is never fully shifted to the right because unprecipitated gold ions are present in the solution and accordingly the liquid residue produced by filtration in the press filter has significant gold concentrations in view of the volumes of cyanides involved.

Another drawback of the prior art for extracting noble metals lies in the smelting steps, during which the slagging of the heavy metals inevitably also entrains noble metals, which therefore are lost. Moreover, in smelting operations there is also a loss of non-noble metals, which can have a certain economic interest when present in significant amounts.

Another drawback of the prior art is the fact that the galvanic refining operations require particular provisions for optimizing work, which however do not prevent the use of noble metal for deposition and cyanide pollution, which is difficult to manage.

SUMMARY OF THE INVENTION

The aim of the present invention is to minimize or considerably reduce the drawbacks found in the prior art.

An object of the present invention is to provide a high level recovery of noble metals in a highly pure form, thus eliminating substantially entirely the loss of noble slag from smelting and process end-fraction residues.

Another object is to provide a process for refining noble metals from auriferous mines by chemical methods with a limited production of acid fume emissions into the atmosphere.

Another object of the present invention is to provide a process for refining noble metals from auriferous mines which is simple to perform and is highly safe for workers.

Another object of the present invention is to provide a process for refining noble metals from auriferous mines which also allows non-noble metals, such as copper, zinc and cadmium, to be recovered in a pure form of considerable commercial interest.

Within the scope of this aim, these objects and others which will become apparent hereinafter, according to the present invention a process for refining noble metals from auriferous mines is provided, in which preferably the auriferous material is first milled and treated with a cyanide solution and which comprises:

advantageously a pretreatment, which comprises a step for separating the complexes of cyanide with the noble metals by means of organic ion-exchange resins and the incineration of said organic resins, preferably at a temperature which is suitable to destroy the cyanide content of the depleted resins, a predefining step, which comprises: an etching of the material incinerated during the pretreatment with a hydrochloric-nitric solution, preferably at the boiling temperature; a subsequent step for separating a solution which contains gold, platinum, palladium, non-noble metals, in the form of chlorides, from a solid residue which contains silver chloride and end-fraction residues; the treatment of said solution with an aqueous solution of ammonium chloride; and an additional step for separating a precipitate which includes salts of platinum and palladium and a solution containing auric chloride;

specific steps for refining gold, palladium, platinum and silver.

The extracted auriferous material is advantageously subjected to a preliminary treatment which comprises the steps of grinding, cyaniding and concentration according to the operating technologies of the prior art.

In particular, the auriferous rocky material is first broken up and then ground, for example in a ball mill, in order to be reduced to a powder. The ground material is then circulated in countercurrent in a solution of cyanides, preferably inside a tank, and then transferred into one or more concentration containers.

In the pretreatment of the auriferous material, the separation step advantageously occurs in separation columns provided with resins which are capable of selectively fixing the complexes of cyanide with noble metals.

According to a first aspect of the present invention, the metals being present in the cyanide solution are flowed through one or more separation columns which include an anionic resin capable of selectively fixing the complexes produced by the reaction between the cyanide solution and the noble metals and have no affinity for non-noble metals. The fixing process is based on an ion-exchange reaction which produces a highly stable complex of noble metal trapped in an organic matrix.

The preferred resins are organic ion-exchange resins, particularly anionic resins, preferably medium-basic resins such as Relite A 470 (Mitsubishi Kasei Corporation). Resins of this kind have a pale yellow coloring and then assume an ocher yellow color when saturated with any noble metal.

When they assume this new color, they are removed, introducing new resins in the columns.

According to one embodiment, multiple separation columns connected in series are used; in this way, the first columns absorb more noble metal than the others and are depleted more rapidly. In order to ensure more uniform consumption it is possible to equip them with a plurality of bypass valves, controlled so as to allow the last regenerated column to become the last of the series, acting as an indicator column.

The liquids from which the noble metals have been extracted can be subjected to a process for recovering the non-noble metals by galvanic methods, in accordance with the prior art, to be subsequently sent to neutralization.

The depleted resins are then incinerated and preferably weighed and mixed.

Incineration of the depleted resins advantageously is carried out in a test reheat furnace operating at approximately 1000° C. in an oxidizing atmosphere, in order to allow total destruction of the cyanide content.

Advantageously, weighing is performed in order to determine the amount of noble metals present during this step of the process.

Mixing advantageously occurs in a mixer of the static type, in order to homogenize the incinerated powder, from which the noble metal content is determined by sampling.

According to one embodiment of the invention, a sample of the mixed material is analyzed in order to determine its noble metal content (sampling).

The sample is initially mixed with flux, preferably in the ratio of 20 g of flux per 100 g of material to be smelted.

The flux advantageously includes borax, wood charcoal, sodium bisulfite, sodium nitrate and sodium metasilicate. A preferred flux is constituted by 80% borax, 10% powdered wood charcoal, 5% sodium sulfite, 2% sodium nitrate, 3% sodium metasilicate; all these percentages are by weight.

After mixing, the mixture is smelted in a furnace for example of the direct-fired type fueled by propane or methane gas, with a removable crucible. The result of the smelting is a bar which is peeled, cleaned by brushing and subjected to optional boiling in a solution of sulfuric acid in order to eliminate all traces of residual flux, then washed with demineralized water and finally dried. When the acid has fully converted into a salt, it is neutralized with hydrated lime, filtered in order to eliminate the calcium sulfate, and then discharged.

The material arriving from said incineration step is then subjected to the prerefining steps and then to the specific steps for refining the noble metals, in accordance with the process of the present invention.

BRIEF DESCRIPTION OF THE DRAWINGS

Further characteristics and advantages of the present invention, with particular reference to the prerefining and refining steps, will become apparent from the following detailed description of a preferred but not exclusive embodiment of a process for refining noble metals, illustrated only by way of non-limitative example in the accompanying drawings, wherein.

DESCRIPTION OF THE PREFERRED EMBODIMENTS

Figure 1:
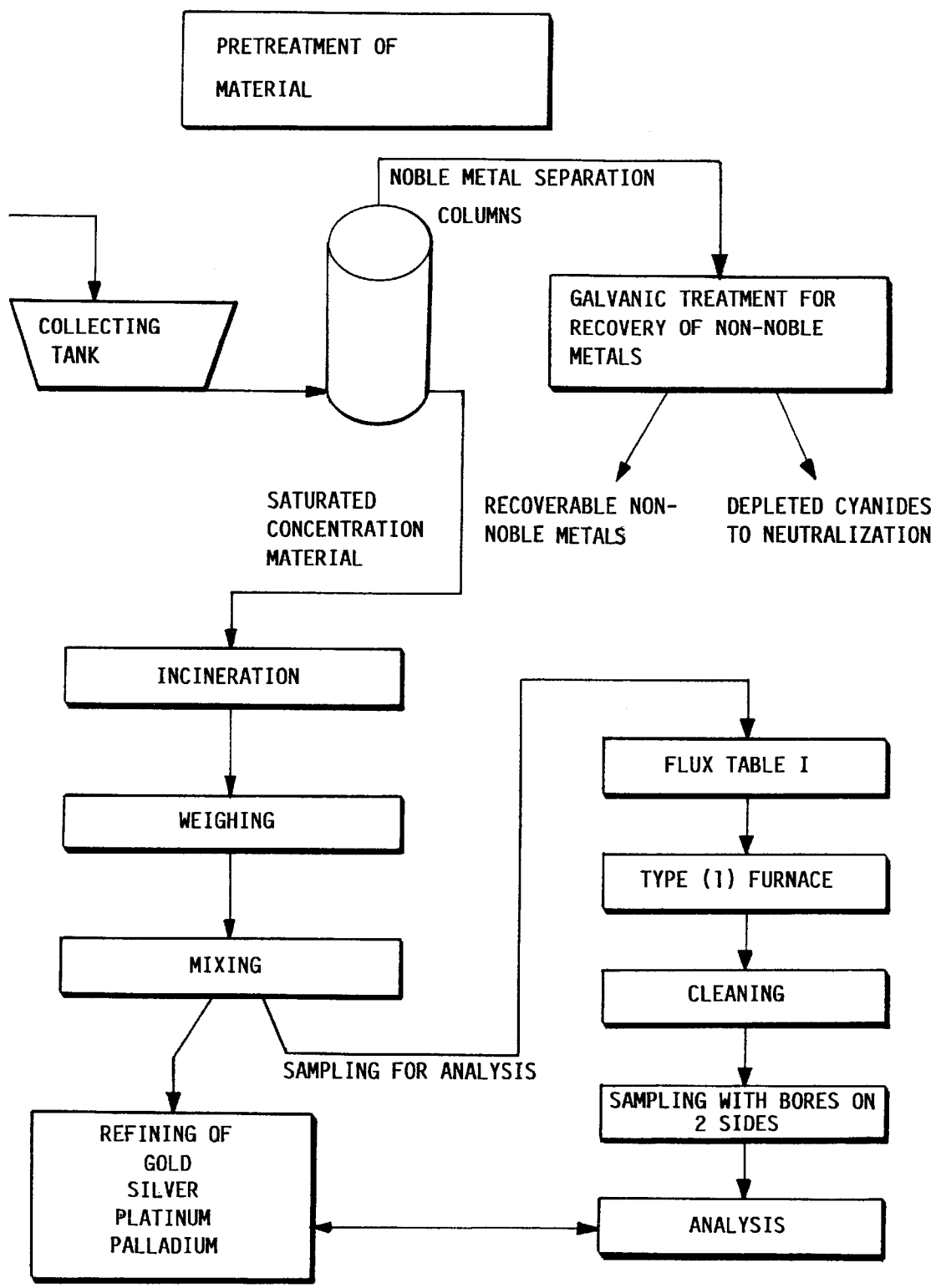
FIG. 1 is a flowchart of the step for the pretreatment of the auriferous material according to the present invention.
Figure 2:
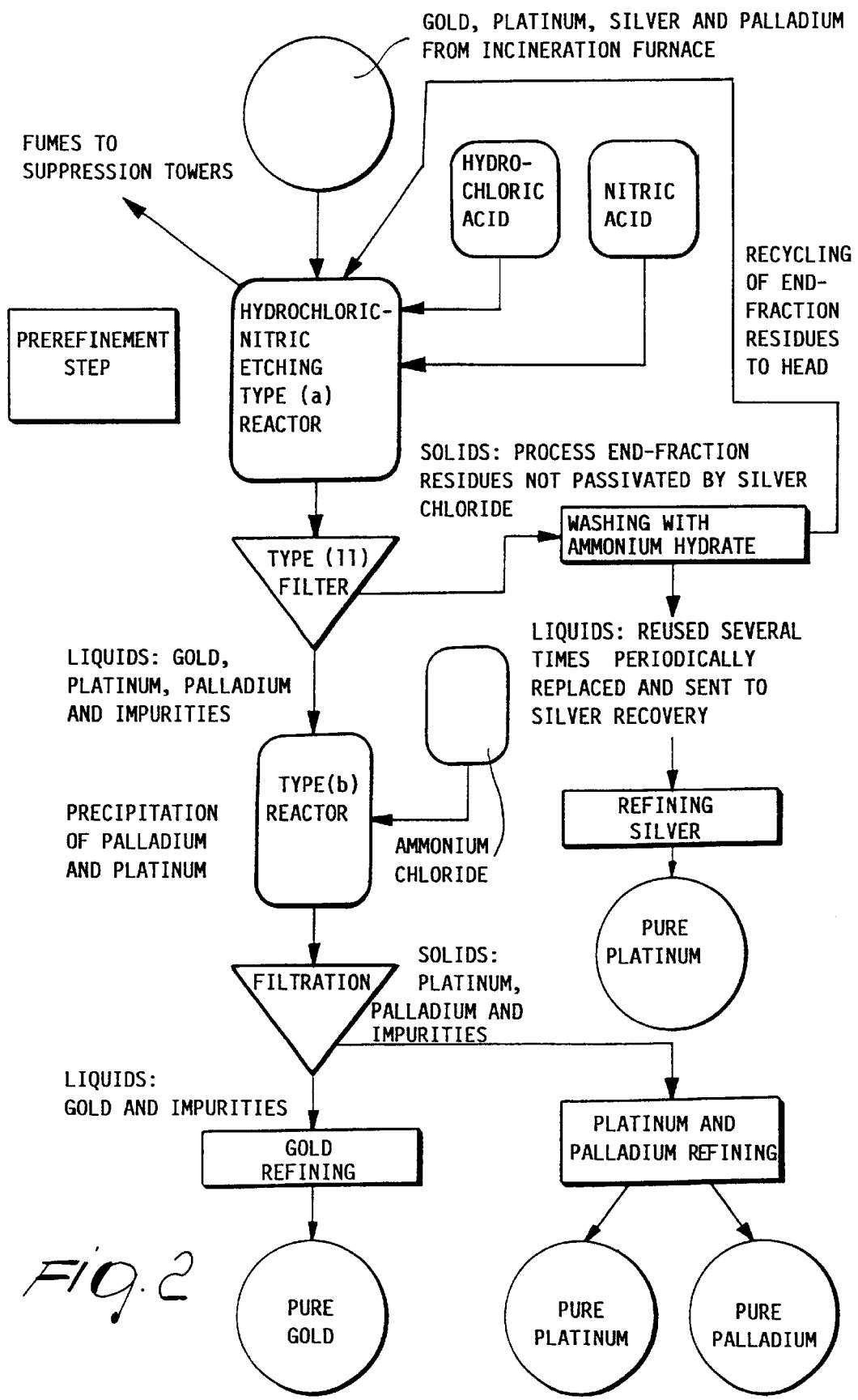
FIG. 2 is a flowchart of the prerefining step of the present process.
Figure 3:
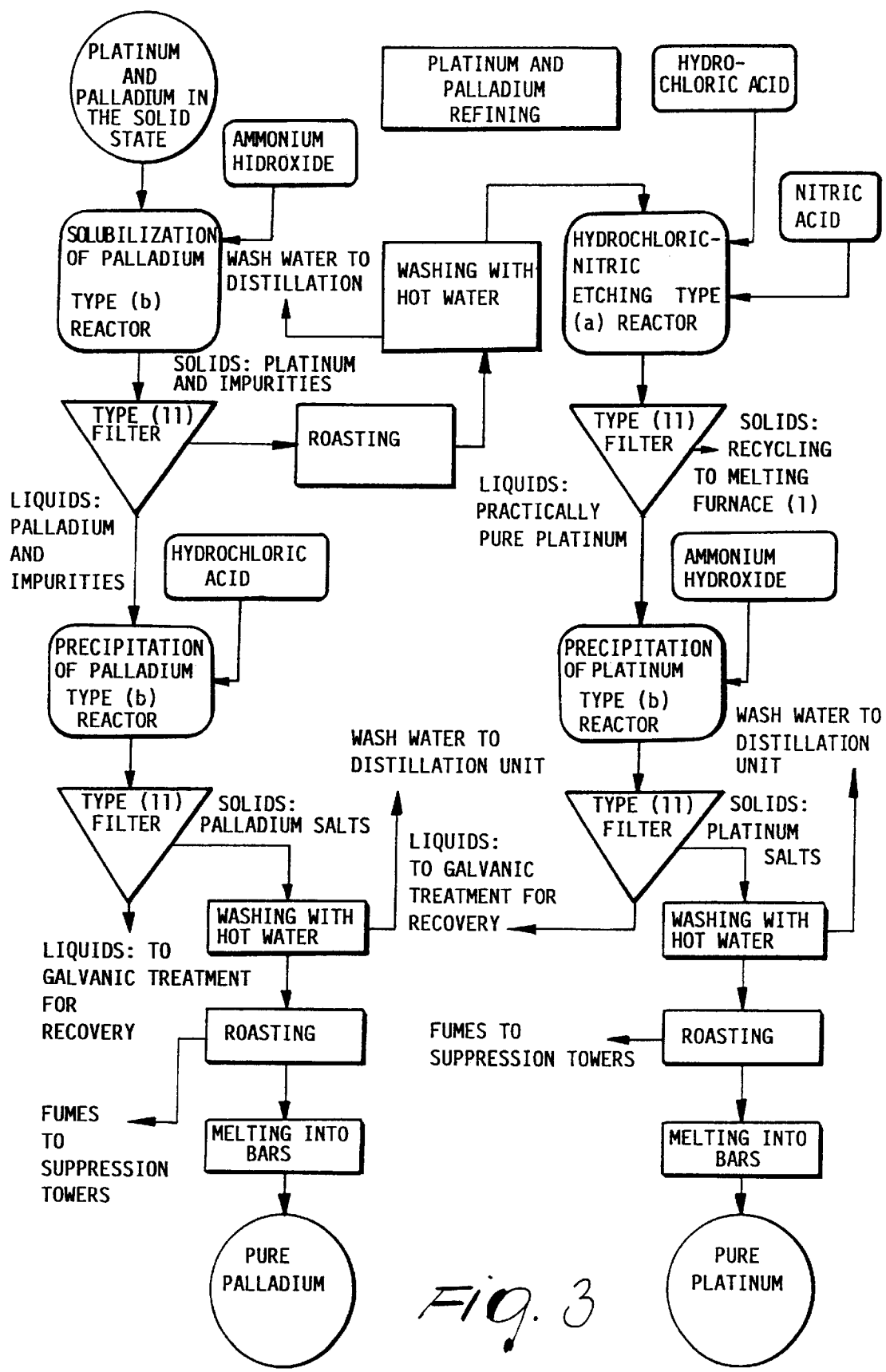
FIG. 3 is a flowchart of the palladium and platinum refining steps according to the process of the present invention.
Figure 4:
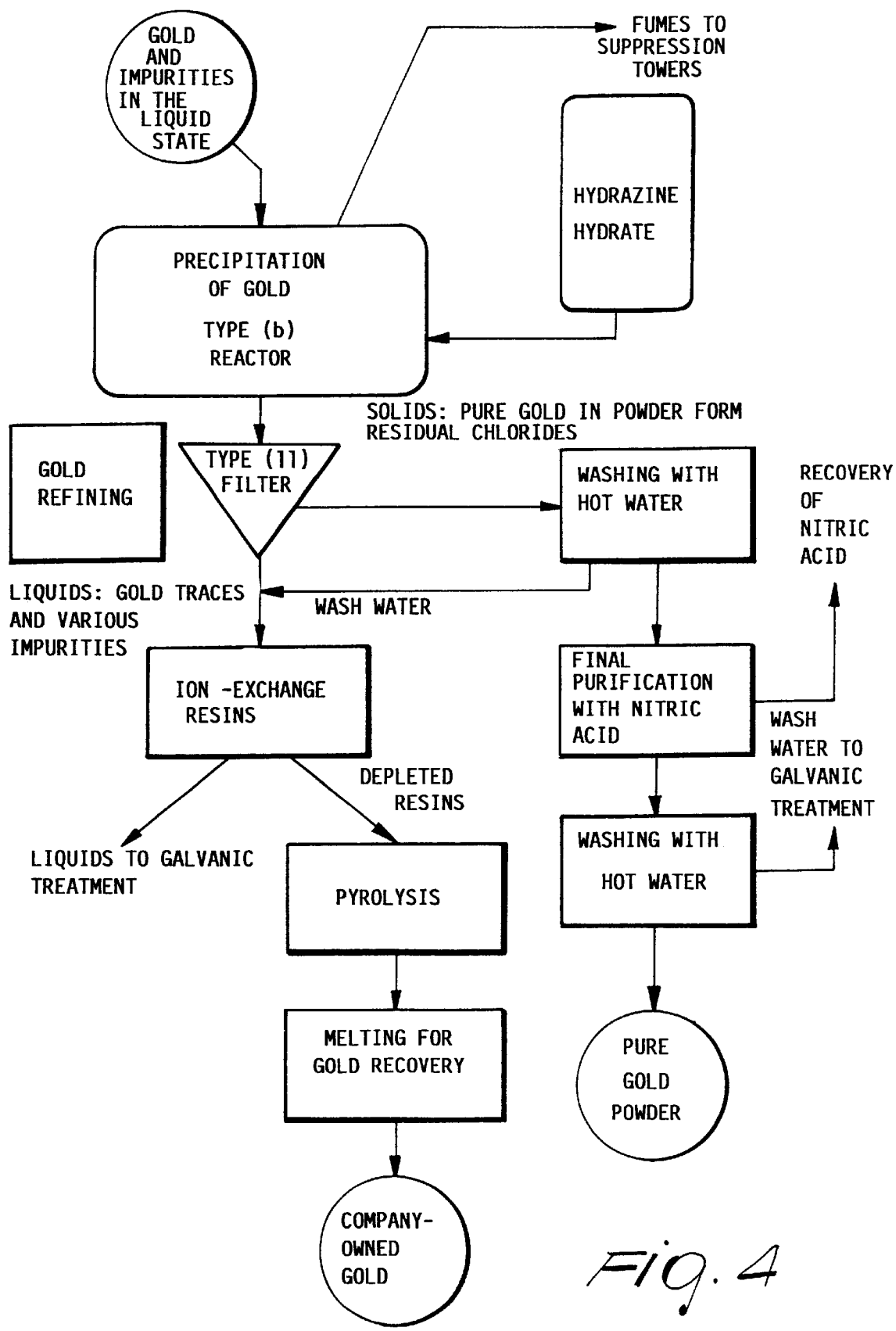
FIG. 4 is a flowchart of the step for refining gold.
Figure 5:
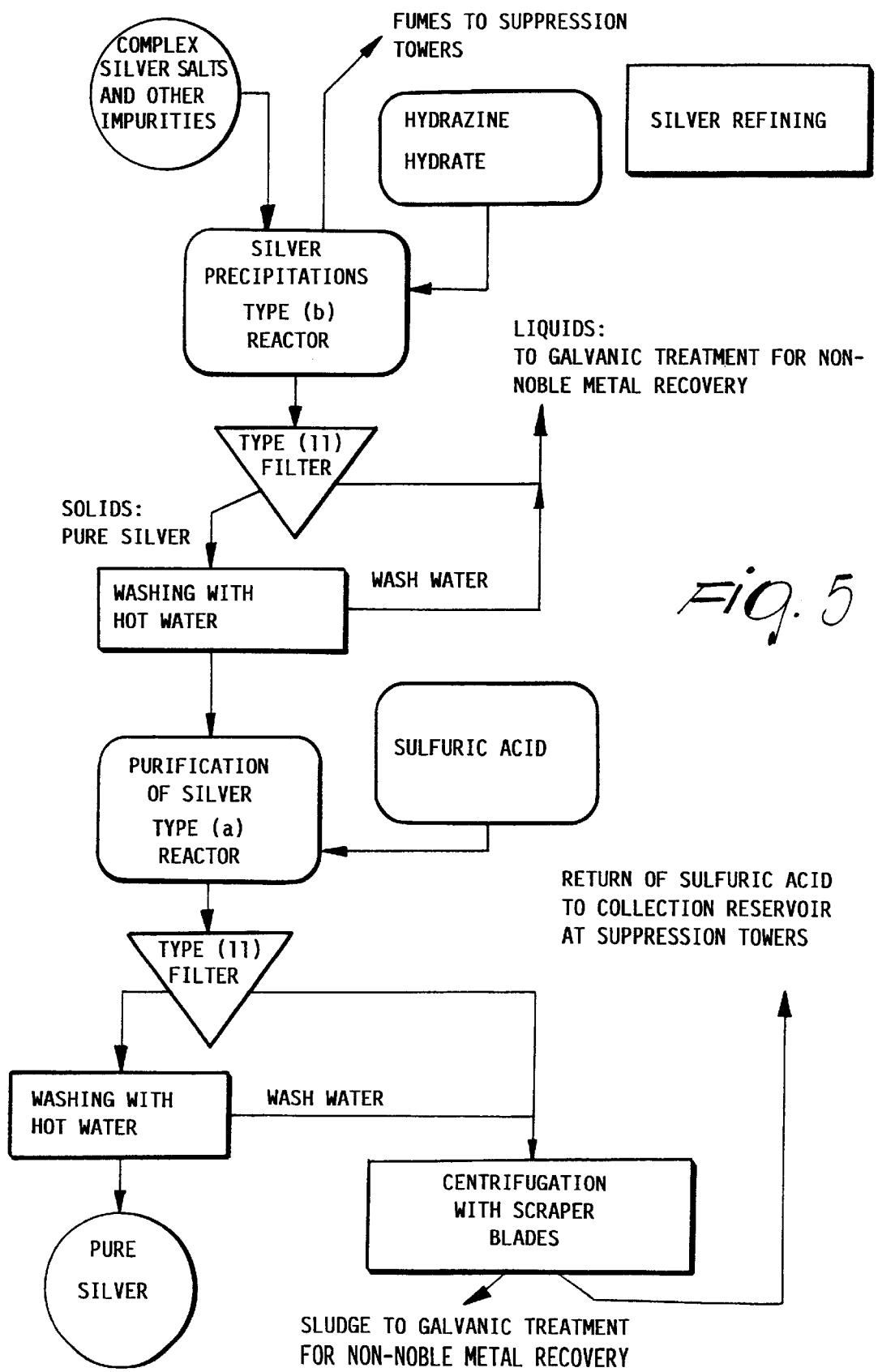
FIG. 5 is a flowchart of the step for refining silver.

Once the auriferous material has been subjected to the above-described pretreatment step, it is sent to the prerefining step, which begins with a hydrochloric-nitric etching (solution).

The expression "auriferous material" is used to designate an extraction material which comprises one or more noble metals chosen among gold, platinum, palladium and silver in addition to other non-noble metals and impurities commonly present in auriferous rock.

The material (resins-noble complexes) previously incinerated in the pretreatment step is etched with a concentrated hydrochloric-nitric solution. Etching occurs in a reactor, for example of the type with a double jacket and a bottom poppet valve, heated with diathermic oil or by means of an arrangeable electric shroud.

The reactor is also advantageously provided with a horseshoe agitator with a rotating scraper on a Teflon surface in order to remove the silver chloride (formed during the hydrochloric-nitric etching) by scraping, thus allowing the hydrochloric-nitric mix to act in depth.

The reactor is loaded with all the hydrochloric acid, preferably as a 37% solution; then heat is applied until the mixture is about to boil and dissolution begins of the nitric acid, preferably as a 65% solution, until it is entirely admixed (0.9 l of nitric acid per kg of grit).

After introducing all the nitric acid, boiling is maintained, advantageously for 40–50 minutes, then cooling is performed and filtration occurs, preferably in vacuum in a filter for example of the Buchner type provided with a vacuum pump and traps for collecting acid fumes. The filtration liquid contains the non-noble metals, palladium, gold and platinum, while the residue of the non-etched grit, coated with silver chloride, remains on the filter.

The dissolution reactions that occur in the reactor are essentially as follows:

$$4HNO_3 = 2N_2O_5 + 2H_2O$$

$$2N_2O_5 = 4NO_x\,gas + 6O$$

$$3O + 2Au \text{ - - } Au_2O_3$$

$$Au_2O_3 + 6HCl \text{ - - } 2AuCl_3 + 3H_2O$$

$$2O + Pt \text{ - - } PtO_2$$

$$PtO_2 + 6HCl \text{ - - } H_2PtCl_6 + 2H_2O$$

$$2O + Pd \text{ - - } PdO_2$$

$$PdO_2 + 6HCl \text{ - - } H_2PdCl_6 + 2H_2O$$

$$6HNO_3+2Au+Pt+Pd+18HCl \rightarrow 6NO_x^{gas}+10H_2O+2AuCl_3+$$
$$H_2PtCl_6+H_2PdCl_6$$

The liquid is then sent to the gold/palladium/platinum refining step, while the solid residue is advantageously reprocessed with the hydrochloric-nitric solution after removing the surface deposits of AgCl by washing in ammonium hydroxide preferably as a 15% solution.

This solubilizes part of the silver; the etching solution is used several times and periodically replaced and sent to treatment in order to recover the silver.

The resulting reaction is a complexation of silver chloride as follows:

$$AgCl+2NH_4OH \rightarrow Ag(NH_3)_2Cl+2H_2O$$

The ammonium hydroxide used for washing is depleted when its concentration in water, which is initially preferably equal to 150 g/l, reaches 35 g/l (that is to say, 1 mole) by being used up by the above reaction.

In the specific noble metal refining step, the previously filtered liquid, which contains gold, palladium and platinum as chlorides is sent to a reactor, preferably of the double-jacket type with a bottom poppet valve and water cooling regulated by a metering reservoir which contains ammonium chloride in a preferably saturated aqueous solution. The ammonium chloride is advantageously introduced in the amount of one mole of ammonium per mole of hexachloroplatinic acid according to the following reaction:

$$2NH_4Cl+H_2PtCl_6 \rightarrow (NH_4)_2PtCl_6+2HCl$$

Also hexachloropalladic acid, in the presence of ammonium chloride, precipitates in the form of ammonium hexachloropalladate:

$$2NH_4Cl+H_2PdCl_6 \rightarrow (NH_4)_2PdCl_6+2HCl$$

whereas auric chloride is not affected by this reaction.

Of these two precipitates, only the palladium salt is soluble in an excess of ammonium ions, while the platinum salt is not: washing with ammonium hydrate allows to separate them.

The filtration residue that remains on the filter is then conveyed to the above-described reactor and added to ammonium hydroxide, preferably in a 15% solution, until the palladium is resolubilized.

Filtration is then performed preferably with a vacuum filter in order to separate a solid residue which contains platinum and a filtration liquid which contains the palladium.

In the specific palladium refining step, according to the present invention, the liquid that arrives from filtration is sent to a reactor, where it is precipitated again with a solution of preferably 37% hydrochloric acid (pH 2–2.5) as a palladous diamino dichloride salt, which is preferably filtered on a vacuum filter, washed with preferably hot water and sent to roasting in a furnace provided with a fume extractor stack in order to be recovered as metallic Pd.

The wash water is sent to distillation, the filtration water is sent to galvanic treatment and the fumes generated by roasting are sent to the suppression towers.

The final smelting, which occurs in a furnace which preferably operates at high frequency and is provided with porcelain crucibles, allows to obtain a palladium bar with a high degree of purity.

In the specific platinum refining step according to the invention, the complex platinum salt formed after washing with ammonium hydroxide is preferably roasted at 100° C. in a roasting furnace advantageously of a type made of acid-resistant material, with a fume extractor stack. The roasting procedure produces metallic platinum from the breakdown of the complex salt. The metal is then advantageously resolubilized in a hydrochloric-nitric mixture in a reactor, which necessarily passing to grit blasting because the metal obtained by roasting is in sponge form, with a large etching surface.

The dissolved platinum is then precipitated as ammonium hexachloroplatinate by means of ammonium hydroxide in a reactor, washed, roasted in a furnace and preferably melted into highly pure platinum bars by means of a furnace.

In the specific gold refining step according to the invention, the gold-containing liquid that arrives from the preceding prerefining step (the preceding filtration must substantially eliminate the traces of end-fraction residues possibly containing AgCl and PdCl, which would otherwise take part in the reaction and make the gold impure) is treated with a reducing agent preferably constituted by hydrazine hydrate to produce metallic gold according to the following reaction:

$$3H_2N-NH_2+AuCl_3 \xrightarrow{HCl} Au+(3-k)NH_4Cl+3/2N_2+kNH_3+kHCl$$

Preferably, 0.9 g of hydrazine hydrate are required for every 1 g of reduced gold and the end of the reaction is characterized in any case by a color change in the point of contact, which when gold is present assumes a dark brown color and becomes green when it has been fully precipitated.

The resulting ammonia fumes are advantageously sent to the alkaline fume suppression towers.

Once the precipitation step has ended, cooling is allowed for approximately 4–5 hours.

It can be found that the amount of nitric acid used in the hydrochloric-nitric etching does not correspond exactly to the stoichiometric amount.

If the calculated values fall short, the result is a higher amount of end-fraction residues, negatively affecting the yield without interference with gold precipitation; for excessive values there is a lower amount of end-fraction residues but the hydrazine interferes with the excess nitric acid, which partially resolubilizes the gold, with a reduction in yield. By repeating the above-described oxidation-reduction in the hydrochloric-nitric etching, resolubilization of the gold into auric chloride is detected through the production of nitrogen dioxide fumes.

When these fumes develop, precipitation with hydrazine is resumed a second time, as described above, until a color change occurs in the point of contact, so that the gold that was resolubilizing is reprecipitated by the reducing action of the hydrazine. This oxidation-reduction mechanism consumes all the excess nitric acid and the precipitate assumes a stable form.

The fumes of this second optional reaction, which mainly contain nitrogen dioxide, are sent to the acid fume suppression towers.

Once cooled, the liquid is filtered in vacuum in a filter in which the gold remains as a fine powder; the gold is then washed with preferably hot water until the chlorides disappear and is then transferred to another reactor and treated with nitric acid, preferably as a 65% solution, and advantageously brought beforehand to 80–85% as final purification.

The acid is then left in contact with the gold, preferably for approximately 10–15 minutes, and filtration is performed. The concentrated acid is recovered and sent to a storage tank, while the purified gold is washed with water and advantageously transferred to casting in bars.

The filtration liquid that arrives from the precipitation of gold with hydrazine still contains ppm of auric chloride, platinum and palladium which are advantageously recovered by passing through an ion-exchange resin for example of the kind of Relite C 250 (Mitsubishi Kasei Co.) in accordance with the above described recovery procedure.

In the specific silver refining step according to the invention, the silver metal that is present in the solution of ammonium hydroxide that originates from the prerefining step is precipitated with hydrazine hydrate as follows:

the hydrazine, in the presence of OH⁻ ions due to an alkaline environment caused by the presence of ammonium hydroxide, generates:

$$H_2N-NH_2+OH^-\rightarrow NH_3+1/2N_2+H_2O+e^-$$

the complexed silver part, in an alkaline environment, is reduced to metallic silver by the reducing action of the generated electron:

$$Ag(NH_3)Cl+e^-\rightarrow Ag+2NH_3+Cl^-$$

the ammonia generated by the reaction in an aqueous environment is converted to ammonium hydroxide which dissociates again:

$$NH_3+H_2O\rightarrow NH_4OH\rightarrow NH_4^++OH^-$$

part of the generated ammonium hydroxide reacts with the Cl ion to form ammonium chloride:

$$NH_4^++Cl^-\rightarrow NH_4Cl$$

the sum of the reactions is:

$$H_2N-NH_2+Ag(NH_3)_2Cl\xrightarrow{OH^-}1/2N_2+Ag+2NH_3+NH_4Cl$$

the remaining ammonia reacts with the silver chloride to form the initial complex:

$$2NH_3+AgCl\rightarrow Ag(NH_3)_2Cl$$

The reaction advantageously occurs in an environment which is not highly alkaline. The reaction ends when the further introduction of hydrazine causes no reaction in the medium. The ammonia fumes are advantageously sent to the fume suppression towers.

The precipitated silver, which is in highly pure form, is preferably filtered in a vacuum filter and, after filtration, washed with water and then poured in a reactor, where a solution of preferably 30% $H_2SO_4$ is added in order to remove the traces of ammonia, which would interfere with the subsequent smelting, and the hydrates of the non-noble metals entrained in filtration. This last step is advantageously performed at 60–70° for 10–15 minutes. Filtration is performed advantageously on a vacuum filter, washing with water is performed until sulfuric acidity is eliminated, obtaining substantially pure silver which is sent to melting.

The sulfuric acid and the wash water are centrifuged in a centrifuge, preferably of the type with scraper blades or with a filtering panel which is fully ebonized. The resulting sludge is sent to galvanic treatment, while the acid wastewater is pumped into a reservoir that supplies an alkaline fume suppression tower.

The reactors used in the present invention advantageously have multiple water-cooled condensers, and the connection pipes connected to the respective suppression columns are located on their heads.

The fumes are preferably sent to a column which contains a plurality of perforated plates, where a solution of potassium hydroxide (30%) flows downward and the gas to be suppressed flows in countercurrent, aspirated by a head fan, and is forced to bubble through the liquid that contains the potash.

While suppression is a simple salification process for all the acid gases, the fumes from the decomposition of nitric acid ($NO_x$) must be converted into $N_2O_5$ by introducing oxygen, reacting with the potash it is converted into potassium nitrate as follows:

$$2NO_x+2O_2\rightarrow N_2O_5$$

$$N_2O_5+2KOH\rightarrow 2KNO_3+H_2O$$

The use of potash is preferred to sodium hydroxide because potassium nitrate is commercially more advantageous: potassium nitrate is sent to a storage reservoir and thence pumped to a crystallization unit, yielding the crystallized salt which can be sold to chemical industries.

Potash is partially recovered from the crystallization unit and is sent to a column.

The apparatus for carrying out the process according to the invention is advantageously controlled by a reservoir containing mains water, which is used to cool the reactors; after use, said water is partly sent to a cooling circuit, such as for example a nest of boiler tubes, and partly sent to a distillation unit to produce process water.

What is claimed is:

1. A process for refining noble metals from auriferous mines, wherein an auriferous material is first milled and treated with a cyanide solution, said process comprising:
    a pretreatment, which comprises separating cyanide complexes from the noble metals by means of ion-exchange organic resins and incinerating said organic resins,
    a prerefining step, which comprises etching the organic resins incinerated during the pretreatment with a hydrochloric-nitric acid solution; separating a solution which contains gold, platinum, palladium, non-noble metals, in the form of chlorides, from a solid residue which contains silver chloride and end-fraction residues; treating said solution with an aqueous solution of ammonium chloride; and separating a precipitate containing salts of platinum and palladium and a solution containing auric chloride;
    refining the gold, palladium, platinum and silver.

2. The process according to claim 1, wherein in the pretreatment the separation of cyanide complexes from the nobles metals occurs in separation columns which are provided with anionic resins capable of selectively fixing complexes of cyanide with noble metals.

3. The process according to claim 1, wherein in the pretreatment the incineration of the organic resins is performed at a temperature which destroys their cyanide content.

4. The process according to claim 1, wherein in the prerefining step the etching with hydrochloric-nitric acid solution is performed at the boiling temperature of the solution.

5. A process for refining noble metals from auriferous mines, wherein an auriferous material is first milled and treated with a cyanide solution, said process comprising:
    a pretreatment, which comprises separating cyanide complexes from the noble metals by means of ion-exchange organic resins and incinerating said organic resins,
    a prerefining step, which comprises etching the organic resins incinerated during the pretreatment with a hydrochloric-nitric acid solution; separating a solution which contains gold, platinum, palladium, non-noble metals, in the form of salts, from a solid residue which contains silver chloride and end-fraction residues.

6. The process according to claim 5, further comprising treating said solution containing gold, platinum, palladium, and non-noble metals with an aqueous solution of ammonium chloride to produce a precipitate containing platinum and palladium salts and a solution containing auric chloride, and separating said precipitate from said solution.

7. The process according to claim 6, further comprising washing said precipitate containing platinum and palladium salts with a solution of ammonium hydroxide in order to produce a solid residue containing platinum and a liquid containing palladium and filtering to separate the solid residue from the liquid.

8. The process according to claim 7, further comprising treating said liquid containing palladium with a solution of hydrochloric acid to produce a precipitate containing palladium and subsequently filtering the treated liquid to separate the precipitate from the liquid.

9. The process according to claim 8, wherein said precipitate is a diamino dichloride palladous salt.

10. The process according to claim 8, wherein said precipitate is roasted to recover palladium in metallic form.

11. The process according to claim 10, wherein said precipitate is first washed with water before being roasted and further wherein the washwater is then sent to a distillation unit.

12. The process according to claim 10, further comprising melting the roasted precipitate to produce a bar of pure palladium.

13. The process according to claim 7, further comprising roasting said solid residue containing platinum to produce metallic platinum; solubilizing metallic platinum in hydrochloric-nitric acid mixture; separating a solid phase from a liquid phase containing the platinum; treating said liquid phase with a solution of ammonium hydrate in order to produce a solid residue containing platinum salts and a liquid; separating the solid residue from the liquid; roasting said solid residue; and melting the roasted solid residue to produce platinum bars.

14. The process according to claim 6, further comprising treating said solution comprising auric chloride with a solution of hydrazine hydrate and filtering the solution to separate a powder containing gold from a liquid containing gold and impurities.

15. The process according to claim 14, comprising washing said powder containing gold to eliminate non-noble metals, in the form of chlorides; treating said powder with a concentrated solution of nitric acid; filtering the resulting solution to recover purified gold in the form of a precipitate; washing and melting the precipitate into bars of pure gold.

16. The process according to claim 14, comprising passing the liquid containing gold and impurities through ion-exchange resins to fix the gold until the resins are depleted; pyrolyzing said depleted resins; and melting the pyrolyzed product to produce pure gold.

17. The process according to claim 5, further comprising treating said solid residue containing silver chloride with a solution of hydrazine hydrate; filtering the resulting solution to separate a precipitate containing silver from a liquid containing non-noble metals; washing the precipitate; treating the washed precipitate with sulfuric acid in order to purify the silver, forming a solid containing silver and an acid solution; filtering to separate the silver solid from the acid solution; washing the silver solid; and melting the silver solid to obtain ingots of pure silver.

* * * * *